(12) United States Patent
D'Alo' et al.

(10) Patent No.: US 8,086,538 B2
(45) Date of Patent: Dec. 27, 2011

(54) MEETING USAGE OF SERVICES IN A ENVIRONMENT

(75) Inventors: Salvatore D'Alo', Rome (IT);
Alessandro Donatelli, Rome (IT);
Giovanni Lanfranchi, Placenza (IT);
Scot MacLellan, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 11/846,885

(22) Filed: Aug. 29, 2007

(65) Prior Publication Data
US 2008/0059378 A1  Mar. 6, 2008

(30) Foreign Application Priority Data
Aug. 29, 2006  (EP) .................................... 06119733

(51) Int. Cl.
*G06F 21/00* (2006.01)
(52) U.S. Cl. ............... 705/59; 705/51; 705/53; 705/56; 705/63; 702/188; 700/122
(58) Field of Classification Search ............... 705/51–63; 702/188; 700/122
See application file for complete search history.

(56) References Cited

U.S. PATENT DOCUMENTS

| | | | |
|---|---|---|---|
| 6,189,146 B1 * | 2/2001 | Misra et al. | 717/177 |
| 7,349,884 B1 * | 3/2008 | Odom et al. | 705/40 |
| 7,440,871 B2 * | 10/2008 | McConnell et al. | 702/188 |
| 7,516,103 B1 * | 4/2009 | Peitrucha et al. | 705/56 |
| 2002/0018545 A1 * | 2/2002 | Crichlow | 379/106.03 |
| 2004/0024483 A1 * | 2/2004 | Holcombe | 700/122 |

* cited by examiner

*Primary Examiner* — Pierre Eddy Elisca
*Assistant Examiner* — Shahid Kamal
(74) *Attorney, Agent, or Firm* — Garg Law Firm, PLLC; Rakesh Garg; Jeffrey S. LaBaw

(57) ABSTRACT

A solution for metering usage of services—for example, in a SOA Framework—is proposed. For this purpose, the submission of any invocation of a provider service by a consumer service is intercepted by a license manager; a corresponding request is then submitted to a dedicated licensing service, which returns an entitlement code when the consumer service is entitled to submit the service invocation. The service invocation is decorated with this entitlement code and actually submitted to the provider service. The (decorated) service invocation addressed to the provider service is likewise intercepted by another license manager; a request is then submitted to the licensing service for verifying the received entitlement code. The running of the provider service is then enabled only if the entitlement code is correct.

16 Claims, 7 Drawing Sheets

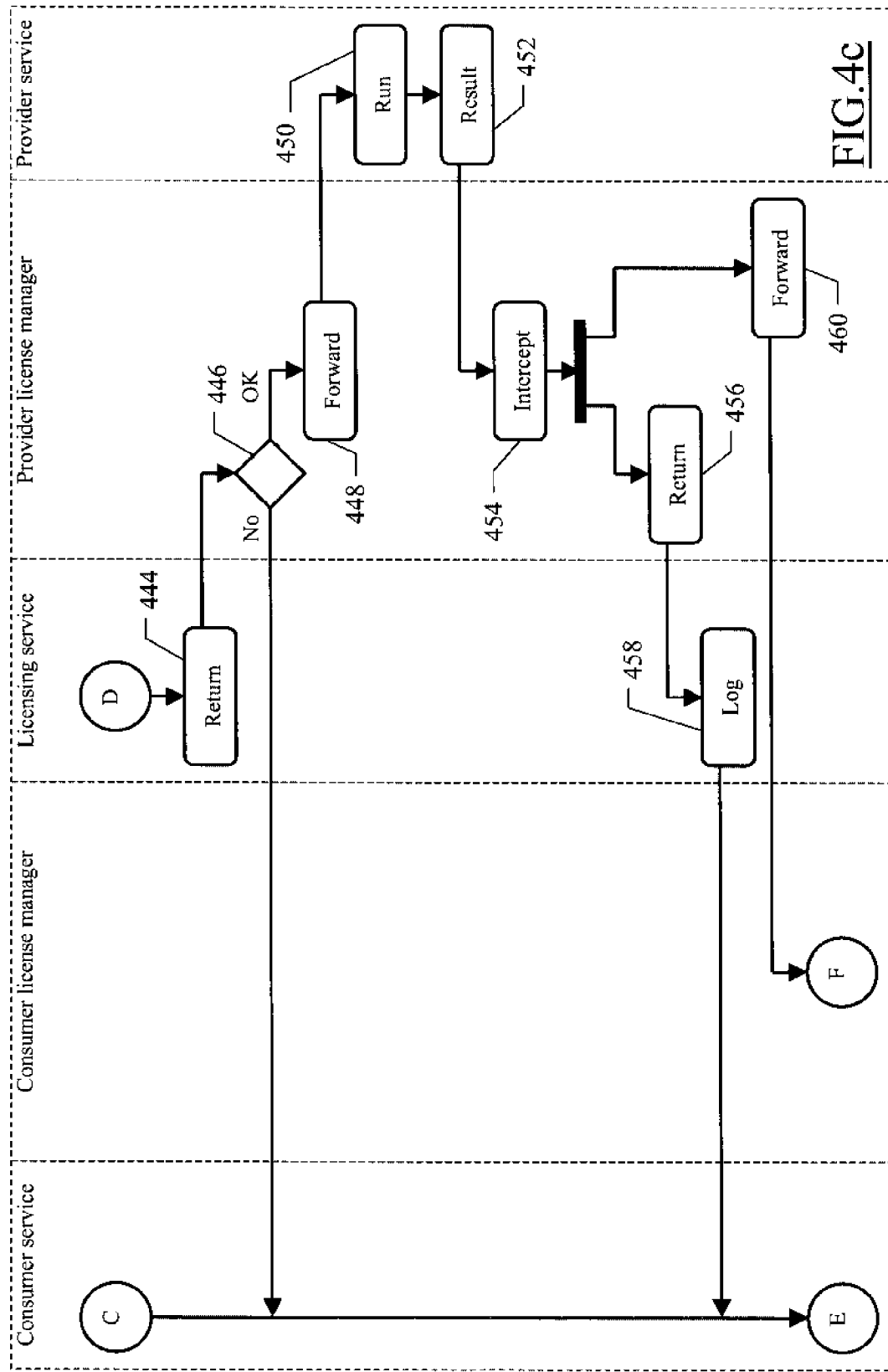

MEETING USAGE OF SERVICES IN A ENVIRONMENT

FIELD OF THE INVENTION

The present invention relates to the information technology field. More specifically, the invention relates to the metering of the usage of services in service-based data processing infrastructures.

BACKGROUND ART

Data processing infrastructures implementing service frameworks (such as the "Service Oriented Architecture, or SOA") have become increasingly popular in the last years. Generally speaking, a service consists of a stand-alone basic task; the service may be invoked through a well-defined interface, which is independent of its underlying implementation. This promotes the reuse and the interconnection of the services (even among different platforms).

Particularly, the services can be combined into composite applications for whatever use. Each application so obtained is very efficient; indeed, the application may exploit different techniques, each one optimized for a specific function. Moreover, this architecture strongly increases the flexibility of the resulting application. For example, it is possible to change the implementation of any service with no impact on the whole application; on the other hand, the application can be readily expanded with new functionalities as soon as the corresponding services are available.

All of the above strongly reduces the development costs of the applications. Particularly, this allows creating dynamic applications, which facilitate a quick response to changing market conditions in a cost effective way. Moreover, this drives the development focus towards activities and interactions, thereby acting as a unifying force between business and applications; as a result, it is possible to obtain applications that are optimized to support the actual business requirements.

However, the extreme flexibility and dynamism of the services do not allow implementing an efficient mechanism for metering their usage. Indeed, the licensing applications known in the art for metering the usage of software products—such as the "IBM Tivoli License Manager (ITLM)" by IBM Corporation—are specifically designed for working in a close environment within a company. More specifically, the available licensing applications can only detect the running of well-defined software products on specific computers; conversely, no licensing application available on the market can be used in an open environment to control the invocation and the running of services, whose operations may be performed by different entities in a number of ways that are not known "a priori".

This problem is particularly acute when the services are offered to clients, so as to enable them to access applications remotely. In this scenario, it is of the utmost importance to control the actual running of the services. For example, this is necessary to ensure the appropriate usage of the services (according to applicable conditions of use). Moreover, this is a prerequisite for allowing charging the correct licensing fees to the clients for their actual usage of the services.

Particularly, it is not possible to ensure compliance with the licenses that are available to the clients; a further risk for the clients if of incurring extra-costs that are not planned.

Therefore, the above-mentioned limitations hinder the widespread diffusion of service-based solutions.

SUMMARY OF THE INVENTION

In its general terms, the present invention is based on the idea of implementing a licensing service.

Particularly, the present invention provides a solution as set out in the independent claims. Advantageous embodiments of the invention are described in the dependent claims.

More specifically, an aspect of the invention proposes a method for metering usage of services in a service-based data processing infrastructure. The method starts with the step of submitting an application invocation of a provider service by a consumer service. The application invocation is intercepted before it is transmitted to the provider service. The method continues by submitting a licensing invocation of a licensing service; the licensing invocation includes an indication of the intercepted application invocation. The transmission of the application invocation is then enabled by the licensing service according to a predetermined enabling policy.

Typically, the licensing service enables the transmission of the licensing invocation to the provider service according to the result of a verification of an entitlement of the consumer service to submit the application invocation (for example, based on licenses know to the licensing service and defined for the consumer service).

As a further improvement, the application invocation is further intercepted before it is processed by the provider service, and a similar licensing invocation is submitted; the processing of the application invocation is then enabled by the licensing service according to a further enabling policy.

Typically, the licensing service enables the processing of the licensing invocation by the provider service according to the result of a verification of an enablement of the consumer service to run the provider service.

In an embodiment of the invention, this result is achieved by means of an entitlement code (which is built by the licensing service in response to the corresponding request).

A way to further improve the solution is of logging information relating to the submission of the application invocation and/or to its processing.

Moreover, it is also possible to log a result (of the processing of the service invocation) being returned by the provider service to the consumer service; in addition or in alternative, it is also possible to log the same result as received by the consumer service.

Another aspect of the invention proposes a computer program for performing the method.

A further aspect of the invention proposes a corresponding system.

A still further aspect of the invention proposes a licensing service for implementing the method.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which:

FIGS. 4a-4d show a diagram describing the flow of activities relating to an implementation of the solution according to an embodiment of the invention.

DETAILED DESCRIPTION

Figure 1:
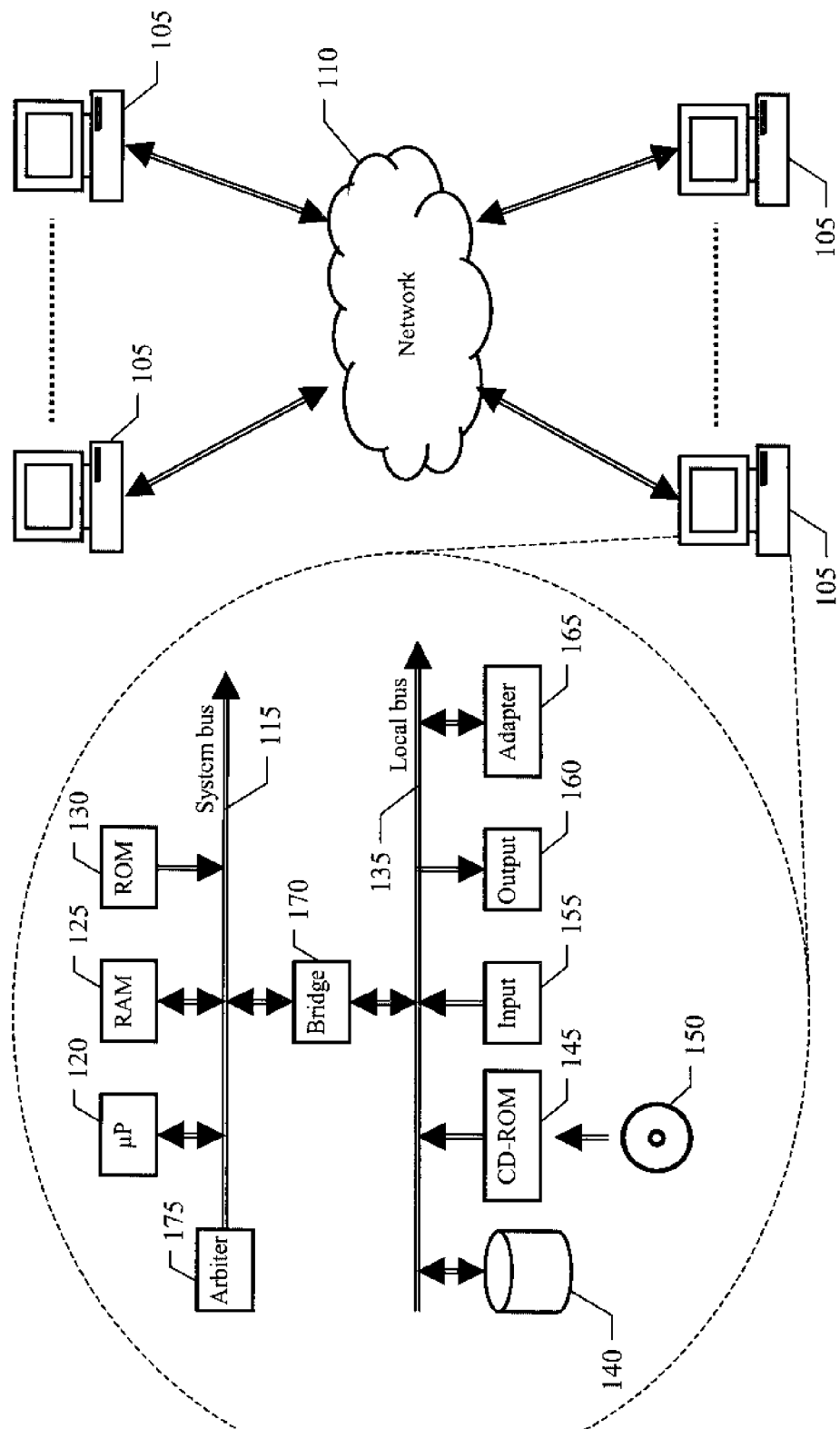
FIG. 1 is a pictorial representation of a data processing system in which the solution according to an embodiment of the invention is applicable.

With reference in particular to FIG. 1, a data processing system 100 with distributed architecture is illustrated. The system 100 includes a plurality of computers 105 (for example, PCs); the computers 105 communicate through a network 110 (such as the Internet).

A generic computer 105 is formed by several units that are connected in parallel to a system bus 115. In detail, one or more microprocessors (μP) 120 control operation of the computer 105; a RAM 125 is directly used as a working memory by the microprocessors 120, and a ROM 130 stores basic code for a bootstrap of the computer 105. Several peripheral units are clustered around a local bus 135 (by means of respective interfaces). Particularly, a mass memory consists of one or more hard-disks 140 and drives 145 for reading CD-ROMs 150. Moreover, the computer 105 includes input units 155 (for example, a keyboard and a mouse), and output units 160 (for example, a monitor and a printer). An adapter 165 is used to connect the computer 105 to the network 110. A bridge unit 170 interfaces the system bus 115 with the local bus 135. Each microprocessor 120 and the bridge unit 170 can operate as master agents requesting an access to the system bus 115 for transmitting information. An arbiter 175 manages the granting of the access with mutual exclusion to the system bus 115.

Figure 2:
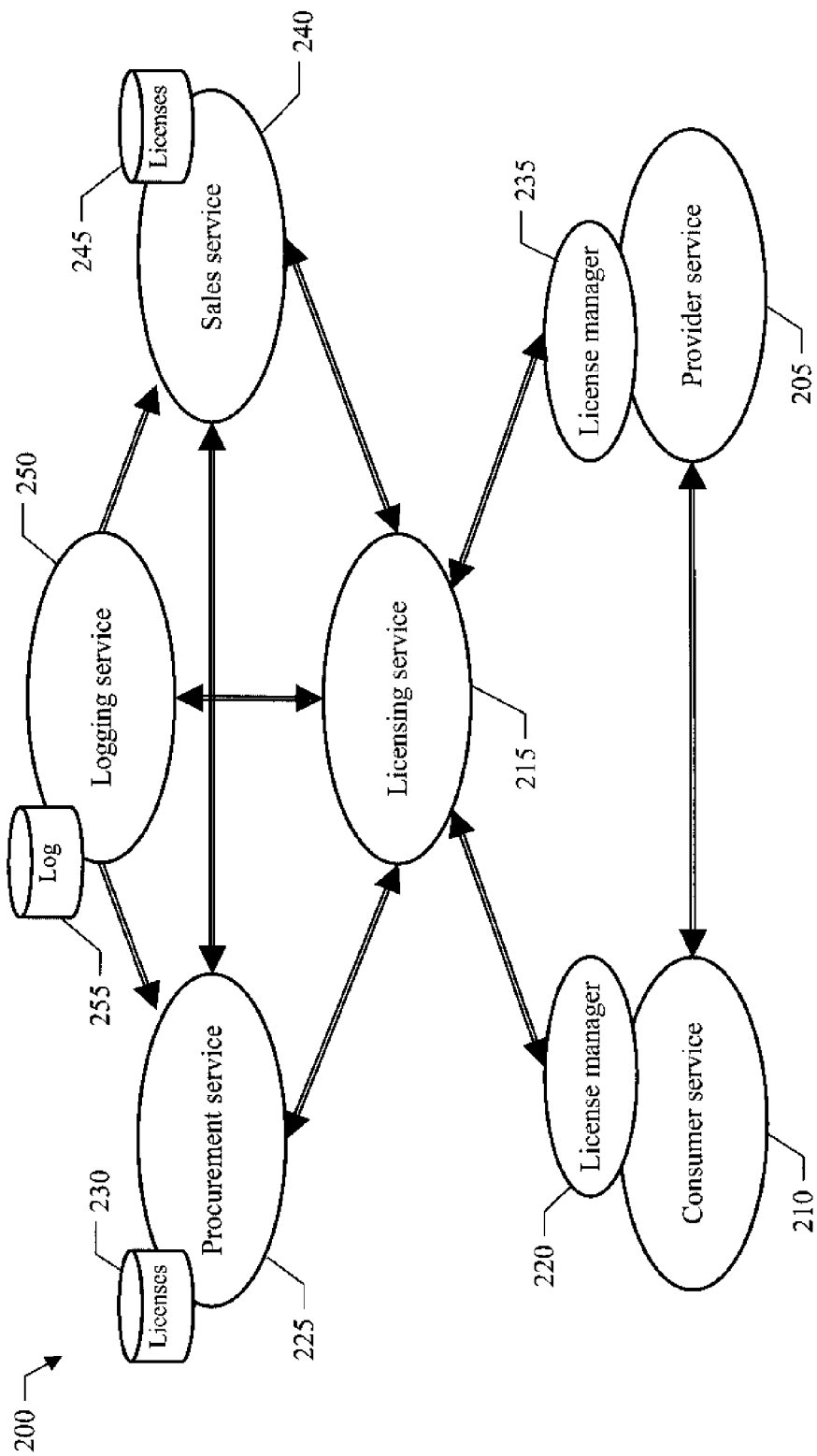
FIG. 2 is a functional representation of a service framework implementing the solution according to an embodiment of the invention.

As shown in FIG. 2, a service framework 200 is implemented on the above-described infrastructure. The framework 200 defines a support for the development and organization of different services. Particularly, the framework 200 prescripts how the services should be built and how they should interact; generally, the framework 200 also provides actual programs (such as development tools, libraries, and the like), which may be used to build any standard functions of the desired services. The services are in turn implemented by means of software components; the relevant information (programs and data) is typically stored on the mass memory and loaded (at least partially) into the working memory of each computer when the programs are running.

Preferably, the framework 200 conforms to the SOA specification. In the SOA context, each service consists of a repeatable task, which may be performed by any provider entity on behalf of any consumer entity. The SOA provides a description language for the formal specification of the function of each service independently of its actual implementation; particularly, the specification (known as contract) includes the description of an interface of the service, which interface may be invoked by any consumer for performing the desired task. The SOA also specifies how the services inter-operate, so that they can work together to accomplish a more complex goal (with each service that may be either the provider of specific functions and the consumer of other services). Particularly, the services are loosely coupled, meaning that each consumer invoking a generic service makes its requirements explicit without any assumption about the corresponding provider; moreover, each interaction is self-contained (i.e., independent of each and every other interaction).

An available implementation of the SOA is the "IBM SOA Foundation" by IBM Corporation, which provides an integrated set of software, best practices and patterns (for example, including the "IBM WebSphere" and the "IBM Rational" applications again by IBM Corporation).

The SOA does not indicate any specific technology for its deployment. However, the SOA typically runs web services. Briefly, the web services are defined in a Web Services Description Language (WSDL) document, which is written in a XML-based specification conforming to the Universal Description, Discovery and Integration (UDDI) standard; particularly, for each available web service the WSDL document describes an abstract definition of messages that can be exchanged, and a concrete definition of their binding to specific transmission protocols. A typical example of transmission protocol that can be used to implement the web services is the Simple Object Access Protocol (SOAP); the SOAP is specifically designed for allowing communications among any kind of operating systems (and especially the transmission of remote procedure calls, or RPCs). The SOAP is in turn bound to an underlying transport protocol—such as the HTTP—which is used to actual convey the messages among different physical nodes (with each node that may support a different transport protocol).

The solution according to an embodiment of the present invention allows metering the usage of any application service 205 offered by a corresponding provider (referred to as provider service) by any consumer through a corresponding service 210 (referred to as consumer service).

For this purpose, as described in detail in the following, a licensing service 215 is proposed. The licensing service 215 tracks any invocation of the provider service 205 (by the consumer service 210); the licensing service 215 can then enable the submission of the service invocation according to whatever licensing policy.

The proposed solution allows achieving the desired goal without impairing the flexibility and dynamism of the environment. Indeed, this technique is implemented within the service framework itself, so as to be substantially opaque to the services that are metered.

The obtained advantages are clearly perceived when the services are offered to clients being enabled to access applications remotely. In this scenario, it is now possible to control the actual running of the services. For example, this allows ensuring the appropriate usage of the services (according to applicable conditions of use). Moreover, in this way it is possible to charge the correct licensing fees to the clients for their actual usage of the services.

Particularly, any service invocation being not enabled is now blocked directly at the consumer side. This prevents the consumer services to submit service invocations without the required entitlements. As a result, it is possible to avoid any risk of being non-complaint with the available licenses, or of incurring extra-costs that are not planned; moreover, this prevents any overhead of the providers.

The proposed technique fosters the widespread diffusion of service-based solutions. For example, an organization can sell its surplus of processing power as a licensable service; this is particularly valuable for Small-Medium Business (SMB) organizations, which can then leverage bigger organizations for specific services.

More in detail, the consumer service 210 is extended with the function of a license manager 220. The license manager 220 intercepts the submission of any invocation of the provider service 205 (by the consumer service 210), and it submits a corresponding entitlement request to the licensing service 215. The licensing service 215 builds an entitlement code for the provider service 205 by using a license defined for the consumer service 205. For this purpose, the licensing service 215 interfaces with a procurement service 225. The procurement service 225 implements all the operations relating to the acquisition of the required rights to run the desired services by the controlled consumers, as defined by corresponding licenses stored in a repository 230. Assuming that the consumer service 201 is entitled to submit the service invocation, the licensing service 215 returns the corresponding entitlement code. The license manager 220 decorates the service invocation with this entitlement code, and then transmits it to the provider service 205 (on behalf of the consumer service 210).

In a similar manner, the provider service 205 is extended with the function of another license manager 235. The license manager 235 intercepts any service invocation (addressed to the provider service 205), and it submits a corresponding enablement request to the licensing service 215. The licensing service 215 verifies the entitlement code associated with the service invocation. For this purpose, the licensing service 215 interfaces with a sales service 240. The sales service 240 implements all the operations relating to the marketing of the rights to run any offered services by the managed providers, as defined by further licenses stored in a corresponding repository 245. Assuming that the entitlement code is correct (for the consumer service 210), the licensing service 215 returns a corresponding enablement to process the service invocation (by the provider service 205).

The procurement service 225 and the sales service 240 also communicate to each other directly, so as to implement automatic acquisition and sale of licenses (for example, according to predefined procurement and selling policies, respectively). In this way, the procurement service 225 can also define the more appropriate strategy for acquiring the required licenses (according to their expected usage); on the other hand, the sales service 240 can define licenses specifically tailored for the different consumers.

The licensing service 215 also interfaces with a logging service 250. The logging service 250 stores information relating to the above-described licensing process (i.e., the invocation of the provider services, their running, and the corresponding results) into a log 255. The log 255 may be accessed by both the procurement service 225 and the sales service 240 (for the respective portion of the licensing information). In this way, the whole licensing process can be properly tracked. Moreover, the sales service 240 can verify that the usage of the offered services is actually charged to the consumers; the same information may also be used to organize more effective marketing campaigns. Vice-versa, the procurement service 225 can verify that it is correctly charged for the actual usage of the acquired services; the same information may also be used to define preferred allocations of the available licenses, so as to optimize their usage.

It is emphasized that the different services may or may not reside in the same organization. In other words, the proposed architecture can scale from a local environment (all contained in a single organization) up to a fully dispersed environment (with multiple organizations that offer and run services, while other organizations are focused on procurement and sales activities). In the latter case, it is then possible to delegate the procurement and/or sales activities to specialized organizations that can capitalize on economic scale; moreover, when both the procurement activity and the sales activity are delegated to the same organization, this operates as an intermediary between the different subjects of the licensing process.

Figure 3:
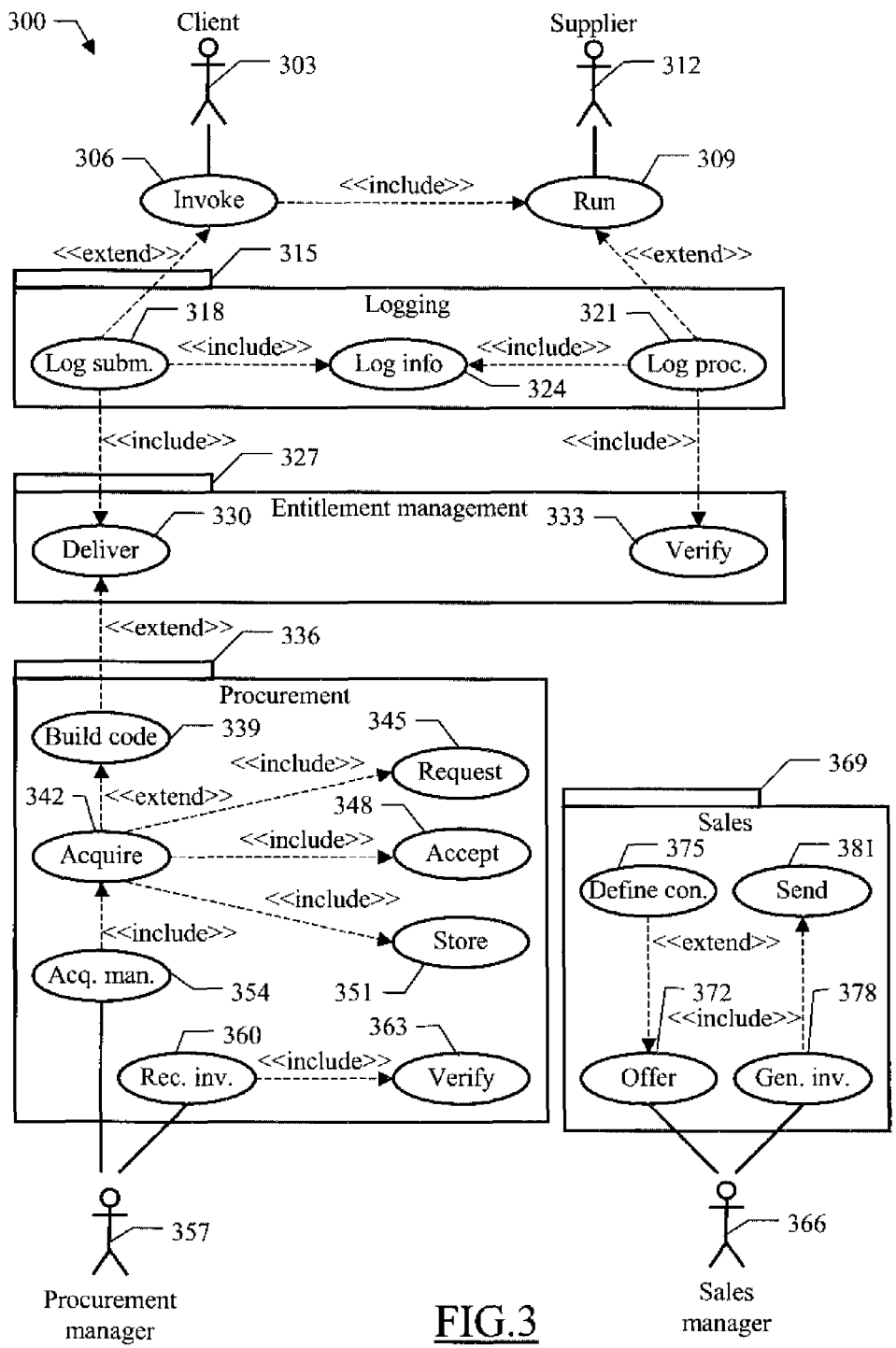
FIG. 3 is an exemplary use case diagram modeling an implementation of the solution according to an embodiment of the invention.
Figure 4A:
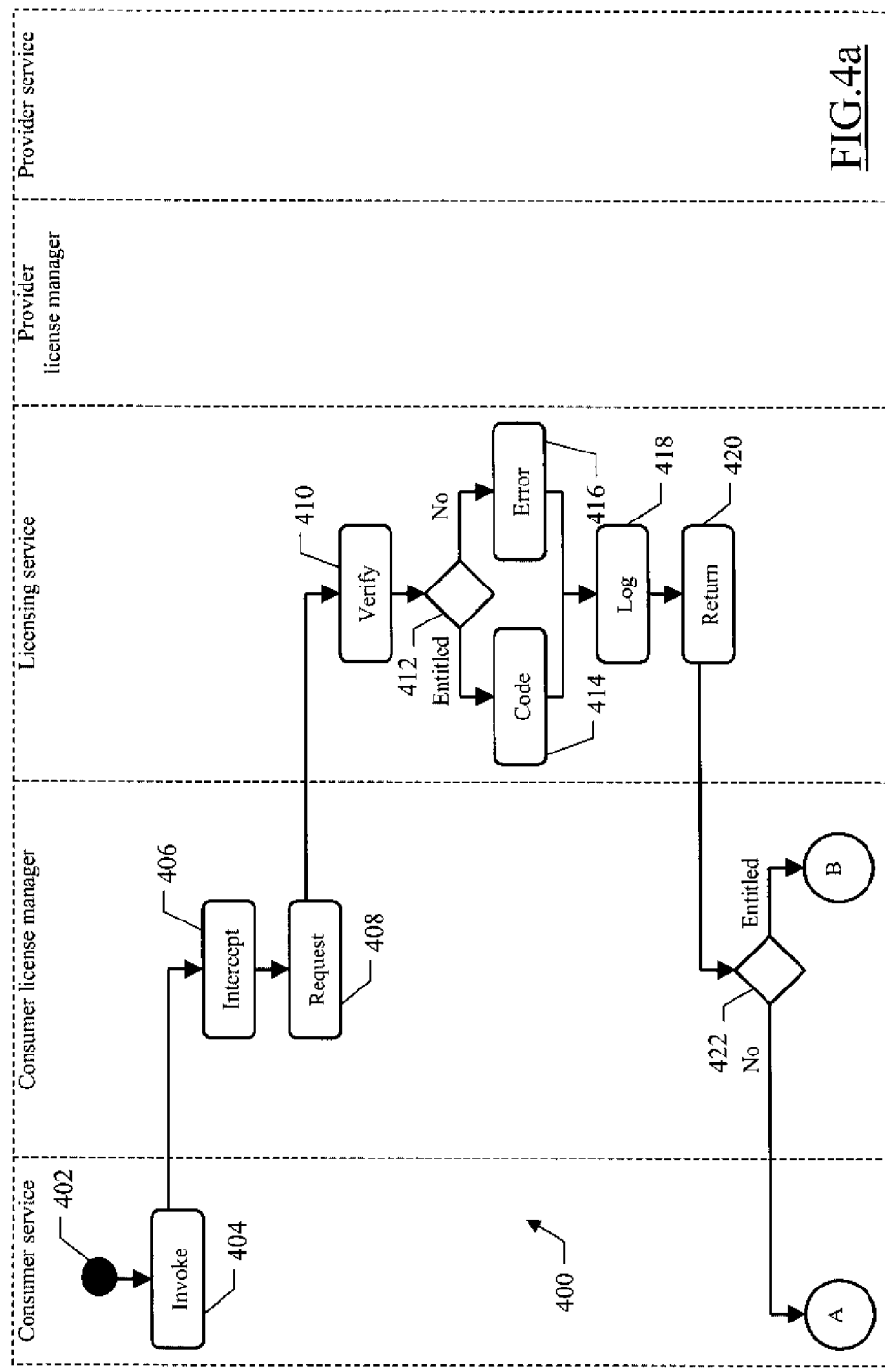
Figure 4B:
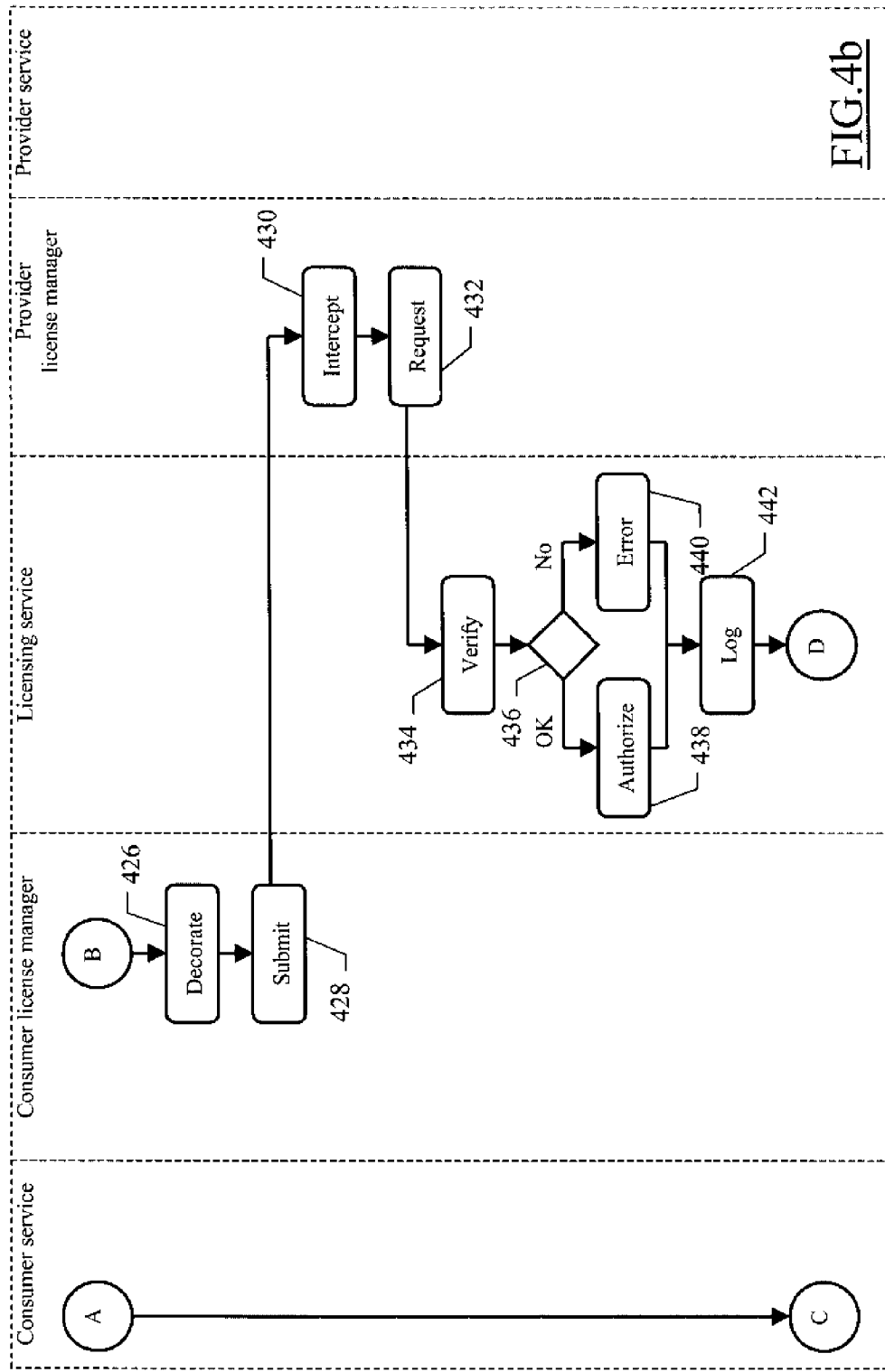
Figure 4D:
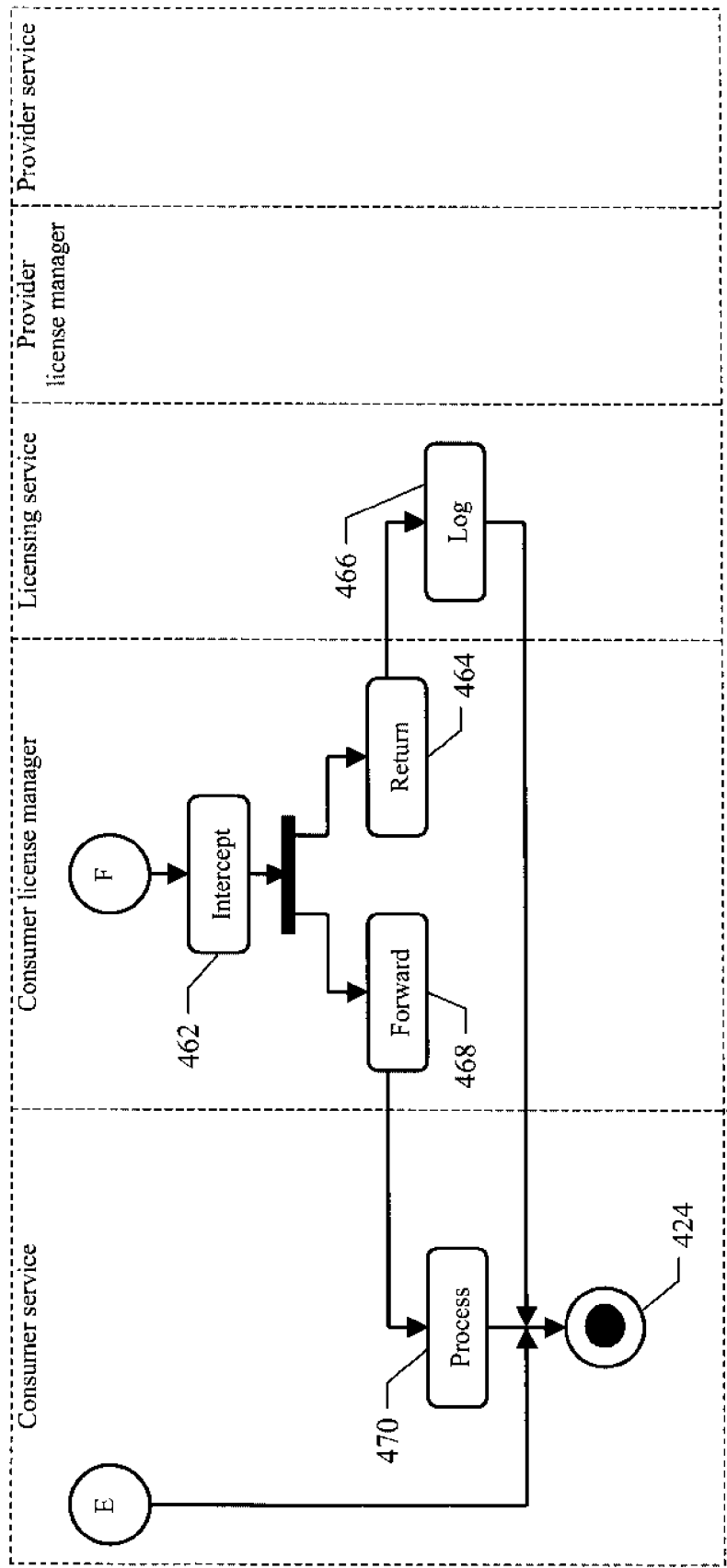

Moving to FIG. 3, a use case diagram 300 modeling the above-described licensing process is shown. Particularly, the figure provides a high level specification of any interactions of users with the system, by means of a set of use cases; each use case represents a scenario that encompasses a sequence of steps being performed to accomplish a specific goal.

In detail, an actor 303 plays the role of client in the system. The client 303 carries out a use case 306, which involves the invocation of the desired provider service (as indicated by a corresponding association). The use case 306 includes a use case 309, which involves the running of the provider service as indicated by a corresponding dependency, meaning that the (source) use case 306 includes the behavior of the (target) use case 309. The use case 309 is in turn carried out by another actor 312, which plays the role of supplier.

Both the use cases 306 and 309 interact with a group of use cases (or package) 315 implementing a logging function. More specifically, the use case 306 is extended by a use case 318, which involves the logging of the licensing information relating to the submission of the service invocation—as indicated by a corresponding dependency, meaning that the (source) use case 318 implements an extension of the (target) use case 306 by adding further functionality (when the above-described solution is deployed). Likewise, the use case 309 is extended by a use case 321, which involves the logging of the licensing information relating to the processing of the service invocation. Both the use cases 318 and 321 include a use case 324, which involves the logging of generic licensing information.

The use cases 318, 321 also interact with a group of use cases 327 implementing an entitlement management function. Particularly, the use case 318 includes a use case 330, which involves the delivering of the entitlement code for the service invocation. Likewise, the use case 321 includes a use case 333, which involves the verification of the same entitlement code.

In turn, the use case 330 interacts with a group of use cases 336 implementing a procurement function. Particularly, the use case 330 is extended by a use case 339, which implements the building of the entitlement code (when the license required for running the provider service is not available yet). The use case 339 is extended by a use case 342, which implements the acquisition of the required license. For this purpose, the use case 342 includes a use case 345 (which implements the request of the license), a use case 348 (which implements the acceptance of the license), and a use case 351 (which implements the storing of the acquired license). The use case 342 is included in a use case 354, which implements the manual acquisition of the same license. The use case 354 is carried out by another actor 357, which plays the role of procurement manager. The procurement manager 357 also carries out a use case 360, which involves the receipt of the invoice for the acquired license. The use case 360 in turn includes a use case 363, which involves the verification of this invoice.

Another actor 366 plays the role of sales manager in the system. The sales manager 366 carries out a group of use cases 369 implementing a sales function. In particular, the sales manager 366 carries out a use case 372, which involves the production of offers for the provider service. The use case 372 is extended by a use case 375, which involves the definition of the terms and conditions for the licenses of the provider service. The sales manager 366 also carries out a use case 378, which involves the generation of the invoices for the licenses being sold. The use case 378 includes a use case 381, which involves the sending of the same invoices.

With reference now to FIGS. 4a-4d, the logic flow of an exemplary licensing process is represented with a method 400. The method begins at the black start circle 402 in the swim-lane of the consumer service.

Continuing to block 404, the consumer service submits an invocation of the provider service. The service invocation is intercepted by the license manager of the consumer service at block 406 (for example, by using well known hooking techniques). The method then passes to block 408, wherein the consumer license manager submits a corresponding entitlement request to the licensing service; typically, the entitlement request includes an indication of the provider service (i.e., its identifier with a possible specification of the requested operations) and an identifier of the consumer service invoking it.

In response thereto, the licensing service at block 410 verifies the entitlement of the consumer service to submit the service invocation; for this purpose, the licensing service exploits the procurement service (not shown in the figure), which determines whether the request meets a license being acquired for the provider service. The method branches at decision block 412 according to the result of the verification. If the consumer service is entitled to submit the service invocation, a corresponding entitlement code (for example, consisting of an identifier of the corresponding license) is provided by the procurement service to the licensing service at block 414. Conversely, an error code is returned at block 416; preferably, the error code has a value indicative of the reason of the refusal to submit the service invocation (for example, because no license is available, the consumer service is not entitled to invoke the provider service or some specific operations thereof, and the like). The flow of activity merges again at block 418, wherein the corresponding licensing information is logged; for this purpose, the licensing service asks the logging service (not shown in the figure) to create a new record for the service invocation being submitted (identified by a corresponding unique handler), with its definition and the result of the verification (including the entitlement code possibly granted). In any case, the licensing service at block 420 returns the result of the verification to the consumer license manager (including the handler being generated for the service invocation).

The consumer license manager verifies at block 422 whether the entitlement code for the invocation service has been granted. If not, the process ends at the concentric white/black stop circles 424 directly. On the contrary, the flow of activity descends into block 426, wherein the consumer license manager decorates the service invocation with the corresponding entitlement code (and its handler). Continuing to block 428, the consumer license manager actually submits the (decorated) service invocation to the provider service (on behalf of the consumer service).

This service invocation is likewise intercepted at block 430 by the license manager of the provider service. The method then passes to block 432, wherein the provider license manager submits a corresponding enablement request to the licensing service; the enablement request includes an indication of the service invocation (with its handler) and an identifier of the consumer service submitting it, together with the received entitlement code.

In a similar manner, the licensing service at block 434 verifies the entitlement code associated with the invocation service; for this purpose, the licensing service exploits the sales service (not shown in the figure), which determines whether the request meets a license being sold for the consumer service. The method branches at decision block 436 according to the result of the verification. If the consumer service is entitled to run the provider service, a corresponding enablement is provided by the procurement service to the licensing service at block 438. Conversely, an error code is returned at block 440; preferably, the error code has a value indicative of the reason of the refusal to run the provider service (for example, because the entitlement code is not correct, the license is not valid, the consumer service is not authorized to run the provider service or some specific operations thereof, and the like). The flow of activity merges again at block 442, wherein the corresponding licensing information is logged; for this purpose, the licensing service asks the logging service to add the received service invocation—with its definition and the result of the verification of the associated entitlement code—to the record identified by the corresponding handler. In any case, the licensing service at block 444 returns the result of the verification to the provider license manager.

The provider license manager verifies at block 446 whether the enablement to run the provider service has been granted. If not, the process ends at the stop circles 424 directly. On the contrary, the flow of activity descends into block 448, wherein the invocation service is forwarded to the provider service. Continuing to block 450, the provider service performs the requested operations. A corresponding result is then returned at block 452 to the consumer service as usual.

The service result is likewise intercepted at block 454 by the provider license manager. The method then forks into two branches that are executed concurrently. Particularly, the provider license manager at block 456 returns the service result to the licensing manager (together with the handler of the corresponding service invocation). In response thereto, the licensing manager at block 458 asks the logging service to add the service result (as returned by the provider service) to the record identified by the handler of the service invocation. The branch then ends at the stop circles 424. At the same time, the provider license manager at block 460 forwards the service result (including its handler) to the consumer service.

The service result is intercepted at block 462 by the consumer license manager. The method then forks into two further branches that are executed concurrently. Particularly, the consumer license manager at block 464 returns the service result (with its handler) to the licensing manager. In response thereto, the licensing manager at block 466 asks the logging service to add the service result (as received by the consumer service) to the record identified by the handler of the corresponding service invocation. The branch then ends at the stop circles 424. At the same time, the consumer license manager at block 468 forwards the service result (by removing the handler) to the consumer service. The consumer service can now process the service result as usual at block 470. The process then ends at the stop circles 424.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a matter of general design choice.

Particularly, the proposed solution may be applied in a data processing system having a different architecture or including equivalent units (for example, based on an Intranet). Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

Moreover, even though the invention has been described with great emphasis for the SOA framework, nothing prevents applying the same solution to whatever service-based infrastructure (for example, conforming to the CORBA standard).

Likewise, it is possible to meter the usage of any other service—being invoked on a generic entity by another entity (implemented on either the same computer or different computers); in addition, equivalent techniques may be used to intercept the required information (i.e., service invocations and related results), even by updating the services directly or by monitoring the messages exchanged among them (without the addition of any dedicated code).

Moreover, the licensing manager may enable the submission of the service invocations according to different policies (for example, based on the number of consumer services requesting it concurrently).

Similar considerations apply to the operations performed on the provider side; in any case, a simplified implementation wherein the usage of the services is metered only on the consumer side or only on the provider side is within the scope of the invention.

Moreover, the use of the proposed solution in a context different from the licensing management is contemplated. Particularly, the information that has been detected about the service invocations can be used for reporting purposes only (without any verification of their entitlements); in this case, the provider services may be always allowed to run (for example, only logging an exception when their running is not enabled).

Alternatively, any other entitlement codes may be used to implement the proposed solution (for example, based on digital certificates). However, nothing prevents reaching the same result with equivalent solutions, even without the handling of any entitlement code (for example, by simply storing all the relevant information on the licensing service only).

It should be readily apparent that the proposed solution may also be put into practice by logging different licensing information (for example, including additional information about the consumer service, the submission of the service invocation, its processing, and the returned service result). In any case, nothing prevents logging part of the above-described licensing information only; for example, it is possible to avoid storing the service result (as returned by the provider service and/or as received by the consumer service), the service invocation (as submitted by the consumer service and/or as received by the provider service), and the like. In any case, a simplified implementation without the logging of any licensing information is contemplated.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing system, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like.

In any case, the solution according to the present invention lends itself to be implemented with a hardware structure (for example, integrated in a chip of semiconductor material), or with a combination of software and hardware.

At the end, even though in the preceding description reference has been made to a specific licensing service, this is not to be intended as a limitation; indeed, the proposed solution may also be implemented with any equivalent service (for example, directly including all the functions of the procurement service, the sales service and/or the logging service).

The invention claimed is:

1. A method for metering usage of services in a service-based data processing infrastructure, the method including the steps of:
    submitting an application invocation of a provider service by a consumer service; intercepting the application invocation before being transmitted to the provider service;
    submitting a licensing invocation of a licensing service, the licensing invocation including an indication of the intercepted application invocation;
    enabling the transmission of the application invocation by the licensing service according to a predetermined enabling policy, including returning an entitlement code to the consumer service in response to the positive verification of the entitlement, the entitlement code being provided to the provider service in association with the application invocation and being provided to the licensing service in association with the further licensing invocation;
    further intercepting the application invocation before being processed by the provider service; and
    enabling the processing of the application invocation by the licensing service according to a predetermined further enabling policy, including verifying the entitlement code.

2. The method according to claim 1, wherein the step of enabling the transmission of the application invocation by the licensing service includes:
    verifying an entitlement of the consumer service to submit the application invocation; and
    enabling the transmission of the application invocation to the provider service in response to a positive verification of the entitlement.

3. The method according to claim 1, further including:
    submitting a further licensing invocation of the licensing service, the further licensing invocation including an indication of the further intercepted application invocation.

4. The method according to claim 3, wherein the step of enabling the processing of the application invocation by the licensing service includes:
    verifying an enablement of the consumer service to run the provider service; and
    enabling the processing of the application invocation by the provider service in response to a positive verification of the enablement.

5. The method according to claim 1, further including at least one of:
    logging an indication of the licensing invocation and of the verification of the corresponding entitlement by the licensing service, and logging an indication of the further licensing invocation and of the verification of the corresponding enablement by the licensing service.

6. The method according to claim 1, further including:
returning an indication of a result of the processing of the application invocation from the provider service to the consumer service; and
one of (i) intercepting the result before being received by the consumer service, submitting a logging invocation of the licensing service for logging the intercepted result in association with the corresponding licensing invocation, and (ii) further intercepting the result before being sent to the consumer service,
submitting a further logging invocation of the licensing service for logging the further intercepted result in association with the corresponding further licensing invocation.

7. A computer program in a non-transitory computer readable storage medium for metering usage of services in a service-based data processing infrastructure, the computer program when executed by a computer system executing a method, the method including the steps of:
submitting an application invocation of a provider service by a consumer service; intercepting the application invocation before being transmitted to the provider service;
submitting using a processor and a memory, a licensing invocation of a licensing service, the licensing invocation including an indication of the intercepted application invocation;
enabling the transmission of the application invocation by the licensing service according to a predetermined enabling policy, including returning an entitlement code to the consumer service in response to the positive verification of the entitlement, the entitlement code being provided to the provider service in association with the application invocation and being provided to the licensing service in association with the further licensing invocation;
further intercepting the application invocation before being processed by the provider service; and
enabling the processing of the application invocation by the licensing service according to a predetermined further enabling policy, including verifying the entitlement code.

8. A system for metering usage of services in a service-based data processing infrastructure, comprising:
a storage device including a storage medium, wherein the storage device stores computer usable program code; and
a processor, wherein the processor executes the computer usable program code, and wherein the computer usable program code comprises:
computer usable code for submitting an application invocation of a provider service by a consumer service;
computer usable code for intercepting the application invocation before being transmitted to the provider service;
computer usable code for submitting a licensing invocation of a licensing service, the licensing invocation including an indication of the intercepted application invocation;
computer usable code for enabling the transmission of the application invocation by the licensing service according to a predetermined enabling policy, including computer usable code for returning an entitlement code to the consumer service in response to the positive verification of the entitlement, the entitlement code being provided to the provider service in association with the application invocation and being provided to the licensing service in association with the further licensing invocation;
computer usable code for further intercepting the application invocation before being processed by the provider service; and
computer usable code for enabling the processing of the application invocation by the licensing service according to a predetermined further enabling policy, including verifying the entitlement code.

9. The product according to claim 7, wherein the step of enabling the transmission of the application invocation by the licensing service includes:
verifying an entitlement of the consumer service to submit the application invocation; and
enabling the transmission of the application invocation to the provider service in response to a positive verification of the entitlement.

10. The product according to claim 7, wherein the method further includes:
submitting a further licensing invocation of the licensing service, the further licensing invocation including an indication of the further intercepted application invocation.

11. The product according to claim 10, wherein the step of enabling the processing of the application invocation by the licensing service includes:
verifying an enablement of the consumer service to run the provider service; and
enabling the processing of the application invocation by the provider service in response to a positive verification of the enablement.

12. The product according to claim 7, wherein the method further includes the steps of:
logging an indication of one of (i) the licensing invocation and of the verification of the corresponding entitlement by the licensing service, and (ii) the further licensing invocation and of the verification of the corresponding enablement by the licensing service.

13. The system according to claim 8, wherein the computer usable code for enabling the transmission of the application invocation by the licensing service includes:
computer usable code for verifying an entitlement of the consumer service to submit the application invocation; and
computer usable code for enabling the transmission of the application invocation to the provider service in response to a positive verification of the entitlement.

14. The system according to claim 8, further comprising:
computer usable code for logging an indication of one of (i) the licensing invocation and of the verification of the corresponding entitlement by the licensing service, and (ii) the further licensing invocation and of the verification of the corresponding enablement by the licensing service.

15. The system according to claim 8, further including:
computer usable code for returning an indication of a result of the processing of the application invocation from the provider service to the consumer service; and
computer usable code for one of (i) intercepting the result before being received by the consumer service, submitting a logging invocation of the licensing service for logging the intercepted result in association with the corresponding licensing invocation, and (ii) further intercepting the result before being sent to the consumer service, submitting a further logging invocation of the licensing service for logging the further intercepted result in association with the corresponding further licensing invocation.

16. The product according to claim 7, further including:
returning an indication of a result of the processing of the application invocation from the provider service to the consumer service; and
one of (i) intercepting the result before being received by the consumer service, submitting a logging invocation of the licensing service for logging the intercepted result in association with the corresponding licensing invocation, and (ii) further intercepting the result before being sent to the consumer service, submitting a further logging invocation of the licensing service for logging the further intercepted result in association with the corresponding further licensing invocation.

* * * * *